United States Patent
Taguchi

(10) Patent No.: US 10,382,430 B2
(45) Date of Patent: Aug. 13, 2019

(54) USER INFORMATION MANAGEMENT SYSTEM; USER INFORMATION MANAGEMENT METHOD; PROGRAM, AND RECORDING MEDIUM ON WHICH IT IS RECORDED, FOR MANAGEMENT SERVER; PROGRAM, AND RECORDING MEDIUM ON WHICH IT IS RECORDED, FOR USER TERMINAL; AND PROGRAM, AND RECORDING MEDIUM ON WHICH IT IS RECORDED, FOR SERVICE SERVER

(71) Applicant: Encryptier Co., Ltd., Osaka (JP)

(72) Inventor: Haruyoshi Taguchi, Osaka (JP)

(73) Assignee: Encryptier Co., Ltd., Osaka (JP)

( * ) Notice: Subject to any disclaimer, the term of this patent is extended or adjusted under 35 U.S.C. 154(b) by 279 days.

(21) Appl. No.: 15/326,668

(22) PCT Filed: Jun. 23, 2015

(86) PCT No.: PCT/JP2015/068006
§ 371 (c)(1),
(2) Date: Jan. 17, 2017

(87) PCT Pub. No.: WO2016/017324
PCT Pub. Date: Feb. 4, 2016

(65) Prior Publication Data
US 2017/0201510 A1     Jul. 13, 2017

(30) Foreign Application Priority Data
Jul. 28, 2014 (JP) .................................. 2014-152516

(51) Int. Cl.
*H04L 29/06* (2006.01)
*G06F 21/31* (2013.01)
(Continued)

(52) U.S. Cl.
CPC ............ *H04L 63/083* (2013.01); *G06F 21/31* (2013.01); *H04L 9/3226* (2013.01);
(Continued)

(58) Field of Classification Search
CPC ............ G06F 21/31; G06F 2221/2115; H04L 2209/80; H04L 63/0428; H04L 63/062;
(Continued)

(56) References Cited

U.S. PATENT DOCUMENTS 6,178,511 B1 * 1/2001 Cohen ................... G06F 21/335
726/6
6,609,198 B1 * 8/2003 Wood ...................... G06F 21/31
713/155

(Continued)

FOREIGN PATENT DOCUMENTS

JP    2001-320365 A    11/2001
JP    2002-305514 A    10/2002
(Continued)

OTHER PUBLICATIONS

International Search Report issued in Application No. PCT/JP2015/068006, dated Oct. 6, 2015 and translation thereof (5 pages).

(Continued)

Primary Examiner — Sharon S Lynch
(74) *Attorney, Agent, or Firm* — Nakanishi IP Associates, LLC

(57) ABSTRACT

A management server, a service server, and a plurality of user terminals are connected to each other via a network so as to be capable of transmitting and receiving data. The management server includes a user information storage unit that stores user identification information for identifying users belonging to a group, and an identification information notification processor that, each time a service to be provided to the users of the group is newly added, transmits the (Continued)

user identification information of the plurality of users belonging to the group to the service server by cryptographic communication, corresponding to the newly added service. The service server includes a service information storage unit for storing the user identification information of the plurality of users corresponding to the service, received from the identification information notification processor.

3 Claims, 9 Drawing Sheets

(51) Int. Cl.
*H04L 9/32* (2006.01)
*H04W 12/06* (2009.01)

(52) U.S. Cl.
CPC ........ *H04L 9/3228* (2013.01); *H04L 63/0428* (2013.01); *H04L 63/062* (2013.01); *H04L 63/104* (2013.01); *H04W 12/06* (2013.01); *G06F 2221/2115* (2013.01); *H04L 2209/80* (2013.01)

(58) Field of Classification Search
CPC ... H04L 63/083; H04L 63/104; H04L 9/3226; H04L 9/3228; H04W 12/06
See application file for complete search history.

(56) References Cited

U.S. PATENT DOCUMENTS

| | | | | |
|---|---|---|---|---|
| 6,986,039 B1* | 1/2006 | Leah | ............. | G06F 21/31 380/274 |
| 7,181,017 B1* | 2/2007 | Nagel | ............. | H04L 9/0825 380/282 |
| 7,676,829 B1* | 3/2010 | Gui | ............. | G06F 21/31 726/5 |
| 7,680,819 B1* | 3/2010 | Mellmer | ............. | G06F 21/31 707/783 |
| 7,869,591 B1* | 1/2011 | Nagel | ............. | H04L 9/0825 380/28 |
| 8,316,237 B1* | 11/2012 | Felsher | ............. | H04L 9/0825 380/282 |
| 8,566,247 B1* | 10/2013 | Nagel | ............. | H04L 63/045 380/270 |
| 8,813,203 B2* | 8/2014 | Anderson | ............. | H04L 9/0894 726/7 |
| 8,904,181 B1* | 12/2014 | Felsher | ............. | H04L 9/0825 380/282 |
| 8,978,093 B1* | 3/2015 | Peon | ............. | H04L 63/0281 370/254 |
| 9,419,951 B1* | 8/2016 | Felsher | ............. | H04L 9/0825 |
| 9,871,656 B2* | 1/2018 | Yao | ............. | H04W 12/04 |
| 2002/0016777 A1* | 2/2002 | Seamons | ............. | G06F 21/445 705/76 |
| 2002/0026427 A1* | 2/2002 | Kon | ............. | G06F 21/31 705/67 |
| 2002/0031230 A1* | 3/2002 | Sweet | ............. | H04L 63/0428 380/278 |
| 2002/0103801 A1* | 8/2002 | Lyons | ............. | G06Q 30/02 |
| 2003/0046541 A1* | 3/2003 | Gerdes | ............. | G06F 21/31 713/168 |
| 2004/0186882 A1* | 9/2004 | Ting | ............. | H04L 63/0861 709/202 |
| 2005/0050317 A1* | 3/2005 | Kramer | ............. | G06F 21/606 713/155 |
| 2006/0053296 A1* | 3/2006 | Busboom | ............. | H04L 63/083 713/182 |
| 2006/0225117 A1 | 10/2006 | Ono et al. | | |
| 2007/0150603 A1* | 6/2007 | Crull | ............. | G06F 21/335 709/227 |
| 2008/0022377 A1* | 1/2008 | Chen | ............. | H04L 63/062 726/5 |
| 2008/0034440 A1* | 2/2008 | Holtzman | ............. | G06F 21/10 726/27 |
| 2009/0070412 A1* | 3/2009 | D'Angelo | ............. | G06Q 10/10 709/203 |
| 2009/0119504 A1* | 5/2009 | van Os | ............. | H04L 9/3271 713/153 |
| 2010/0107225 A1* | 4/2010 | Spencer | ............. | H04L 63/0876 726/4 |
| 2010/0138652 A1* | 6/2010 | Sela | ............. | G06F 21/445 713/158 |
| 2011/0276627 A1* | 11/2011 | Blechar | ............. | G06F 21/41 709/203 |
| 2012/0005474 A1* | 1/2012 | Bourret | ............. | G06F 21/34 713/150 |
| 2012/0106735 A1 | 5/2012 | Fukuda | | |
| 2012/0109734 A1* | 5/2012 | Fordyce, III | ............. | G06Q 20/10 705/14.25 |
| 2012/0109882 A1* | 5/2012 | Bouse | ............. | G06Q 10/10 707/607 |
| 2012/0215640 A1* | 8/2012 | Ramer | ............. | G06Q 30/02 705/14.55 |
| 2015/0039883 A1* | 2/2015 | Yoon | ............. | H04L 9/0847 713/155 |
| 2015/0381621 A1* | 12/2015 | Innes | ............. | G06F 21/31 726/7 |
| 2016/0005032 A1* | 1/2016 | Yau | ............. | G06Q 20/3278 705/69 |
| 2016/0261411 A1* | 9/2016 | Yau | ............. | H04L 63/0807 |
| 2016/0337354 A1* | 11/2016 | Smadja | ............. | H04W 4/70 |
| 2017/0118026 A1* | 4/2017 | Yao | ............. | H04W 12/04 |
| 2018/0332471 A1* | 11/2018 | Zhu | ............. | H04W 76/10 |

FOREIGN PATENT DOCUMENTS

| | | |
|---|---|---|
| JP | 2006-268588 A | 10/2006 |
| JP | 2006-285619 A | 10/2006 |
| JP | 2008-217366 A | 9/2008 |
| JP | 2010-211294 A | 9/2010 |
| JP | 2013-162360 A | 8/2013 |
| JP | 2014-127721 A | 7/2014 |
| WO | 2010/150813 A1 | 12/2010 |

OTHER PUBLICATIONS

Written Opinion of International Searching Authority PCT/JP2015/068006, dated Oct. 6, 2015 (4 pages).
Network Computing Service with a Contactless IC-card, published by NTT R&D, issued on Oct. 10, 1998 (10 pages).

* cited by examiner

USER INFORMATION MANAGEMENT SYSTEM; USER INFORMATION MANAGEMENT METHOD; PROGRAM, AND RECORDING MEDIUM ON WHICH IT IS RECORDED, FOR MANAGEMENT SERVER; PROGRAM, AND RECORDING MEDIUM ON WHICH IT IS RECORDED, FOR USER TERMINAL; AND PROGRAM, AND RECORDING MEDIUM ON WHICH IT IS RECORDED, FOR SERVICE SERVER

TECHNICAL FIELD

The present invention relates to user-information management systems, to user-information management methods, to programs, and recording media on which they are recorded, for management servers, to programs, and recording media on which they are recorded, for user terminals, and to programs, and recording media on which they are recorded, for service servers, for managing information on pluralities of users making up group.

BACKGROUND ART

Cryptographic communications have been widely used to date in order to prevent information leakage and to enhance security performance. Technology whereby encryption keys employed in such cryptographic communications are generated on an authentication server, which is separate from user terminals (nodes), and distributed to each terminal is known (reference is made, for example, to Patent Document 1). Technology whereby user terminals are registered on a content server, which runs the services that provide the content, is also known (reference is made, for example, to Patent Document 2).

CITATION LIST

Patent Literature

Patent Document 1: WO 2010/150813
Patent Document 2: JP 2002-305514 A

SUMMARY OF INVENTION

Technical Problem

The above-described technologies, however, require that when a service server or a new service is added in cases, such as with content servers, where a service is provided to users, the users be registered again in correspondence with the added service. In this way reregistering a user for different services has run the risk of, for example, differing names getting registered as the username, such that the identification information identifying the user may end up being different from one service to another. The identification information for the same user in this way differing from one service to another makes management of the user information complicated and inconvenient.

An object of the present invention is to make available a user-information management system, a user-information management method, a program, and a recording medium on which it is recorded, for management servers, a program, and a recording medium on which it is recorded, for user terminals, and a program, and a recording medium on which it is recorded, for service servers, for enabling identification information representing the same user to be matched among a plurality of services even when a new service is added.

Solution to Problem

A user information management system according to the present invention comprises: a management server for managing information on a group containing users; user terminals respectively corresponding to the users; and a service server for providing services to the users; wherein the management server, the service server, and the user terminals are connected via a network to enable mutual transmission and reception of data; the management server and the service server are enabled for cryptographic communications with each other; the management server comprises user information storage storing user identification information for respectively identifying the users belonging to the group, and an identification-information notification processor for, whenever a service provided to the users in the group is newly added, transmitting to the service server by means of the cryptographic communications the user identification information for the users belonging to that group that corresponds to the service being added; and the service server comprises service information storage storing the identification information, received from the identification-information notification processor, for the users corresponding to the service.

With this configuration, the user identification information for identifying the users belonging to the one or more groups is stored in the user information storage of the management server, and whenever a service provided to the users in the group is newly added, the user identification information for the users belonging to the group which correspond to the newly added service is transmitted from the identification-information notification processor of the management server to the service server by means of the cryptographic communications. Therefore, the same user identification information can be transmitted to each of the servers while ensuring security by means of cryptographic communications. As a result, even when a new service is added, the user identification information indicating the same user can be matched among a plurality of services.

It is preferable that whenever a user is newly added belonging to the group, the identification-information notification processor further transmits, by means of the cryptographic communications, user identification information for the added user to the service server providing services to that group.

With the just-described configuration, whenever a user is newly added to the group, the user identification information for the added user is transmitted to the one or more service servers that provide the services to the group by means of cryptographic communications. Thus, the user identification information for a new user can be registered on the service servers corresponding to all the services available to the group by merely adding the new user to the group.

It is preferable that the user terminals comprise a service-key acquisition section for executing a service key acquisition process of accessing the service server providing the services, and acquiring from the service server a service authentication key for receiving provision of a service, and a service-server access section for using the service authentication key to access the service server; and the service server comprises an authentication section for, when there has been an access from a user terminal, acquiring the service authentication key from the user terminal and carrying out authentication using the acquired service authentication key, and a service providing section for providing, when the authentication has succeeded, the service to the user terminal for which the authentication has succeeded.

With this configuration, a user terminal attempts to access a service server using the service authentication key acquired from the service server. If the authentication has succeeded, the service is provided to the user terminal for which the authentication has succeeded. Therefore, the security performance of the service is enhanced.

It is preferable that the authentication section, when there has been an access from a user terminal, further acquire user identification information from the user terminal, and if the acquired user identification information matches any of the users' identification information stored in the service information storage, the authentication unit carry out authentication using the service authentication key.

With this configuration, when a user who should not receive the service attempts to access the service server, the user identification information for the user does not match any of the users' identification information stored in the service information storage. Therefore, the authentication fails. As a result, the risk of providing the service to the users who are not intended to receive the service is reduced, and security performance is enhanced.

The present invention also provides a user information management system comprising: a management server for managing information on users; user terminals respectively corresponding to the users; and a service server for providing services to the users; wherein the management server, the service server, and the user terminals are connected via a network to enable mutual transmission and reception of data; the management server and the service server are enabled for cryptographic communications with each other; and the user terminals comprise a service-key acquisition section for executing a service key acquisition process of accessing the service server providing the services, and acquiring from the service server a service authentication key for receiving provision of a service, and a service-server access section for using the service authentication key to access the service server.

With this configuration, the user terminals access the service server using the service authentication keys acquired from the service server. Thus, the service server can authenticate the user terminals. The security performance of the services can be enhanced easily.

It is preferable that the management server further comprises a decryption section for decrypting user-terminal encrypted encryption information; the service key acquisition process comprises a first step of encrypting, such as to be decryptable by the decryption section, and transmitting to the service server, a session password for utilization in encryption by the service server; the service server further comprises a decryption request processor for receiving an encrypted session password from a user terminal and transmitting the encrypted session password to the management server by means of the cryptographic communications; and the management server further comprises a reply processor for causing the decryption section to decrypt the session password transmitted from the decryption request processor, and transmitting the decrypted session password to the service server by means of the cryptographic communications.

In some cases, the service server may be operated by a third party, so the service server by default does not store encryption keys for carrying out cryptographic communications with the user terminals. This enhances the security of the cryptographic communications. With this configuration, a user terminal encrypts a session password to be used in encryption at a service server in such a manner that the session password can be decrypted by the decryption section of the management server, and the user terminal transmits the encrypted session password to the service server. The encrypted session password is transmitted from the service server to the management server by means of cryptographic communications, decrypted at the management server, and sent back to the service server. This allows the service server to be informed of the encrypted session password without informing the service server of an encryption key for carrying out cryptographic communications with the user terminal. Therefore, it is possible to carry out cryptographic communications between the service server and the user terminal using the session password.

It is preferable that the service server further comprises a service key transmission section for encrypting, using the decrypted session password, and transmitting to a user terminal a service authentication key; and the service key acquisition process further comprises a second step of acquiring the service authentication key by decrypting, by means of the session password, the encrypted service authentication key.

With this configuration, the user terminals can acquire the service authentication keys by means of the cryptographic communications using the session passwords between the user terminals and the service server that by default do not store encryption keys for carrying out cryptographic communications with the user terminals. Therefore, the security related to provision of the service is enhanced.

It is preferable that: in the first step, the service-key acquisition section further encrypts, such as to be decryptable by the decryption section, and transmits to the service server, a management authentication key for authentication that the management server carries out; the decryption request processor further receives the encrypted management authentication key from a user terminal, and transmits the encrypted management authentication key to the management server by means of the cryptographic communications; the reply processor carries out authentication by decrypting, by means of the decryption section, the management authentication key transmitted from the decryption request processor, and if the authentication fails, reports the authentication failure to the service server; and if failure is reported from the reply processor, the service key transmission section does not carry out transmission of the service authentication key to the user terminal.

Because the service server may be operated by a third party, the service server by default do not store authentication keys for verifying whether or not the user terminals (users) are genuine. This enhances the security of user information. The management server carries out user authentication, and if the authentication fails, the management server does not transmit the service authentication key to the user terminal. This reduces the risk of use of the service by unauthorized users.

It is preferable that: the management server further comprises a service server information storage storing service-server identification information for identifying the service server; the service server, when carrying out communications with the management server, transmits to the management server service-server identification information identifying the service server itself; the user terminals further comprise a service-server information acquiring section for receiving the service-server identification information from the management server; the service-key acquisition section, in the first step, further encrypts, such as to be decryptable by the decryption section, and transmits to the service server, the service-server identification information; the decryption request processor further receives the encrypted service-server identification information from a user terminal, and transmits the encrypted service-server identification information to the management server by means of the cryptographic communications; and the reply processor causes the decryption section to decrypt the service-server identification information transmitted from the decryption request processor, checks whether or not the decrypted service-server identification information matches the service-server identification information for that service server from which the service-server identification information has been transmitted, and if the information does not match, does not execute transmission of the decrypted session password to that service server.

With this configuration, the service server identification information for the service server that a user terminal is attempting to access is encrypted and sent from the user terminal via the service server to the management server. Also, the service server identification information for the service server that has actually accessed the management server is sent from the service server to the management server. The reply processor of the management server checks whether or not those two pieces of service server identification information match, and if they do not match, the reply processor does not transmit the decrypted session password to the service server. If they do not match, it is possible that the user has made a mistake in choosing a service server to make a service request, or it is possible that an unauthorized service server masquerades as a genuine service server. For this reason, if the two pieces of service server identification information do not match, the decrypted session password is not sent back to the service server. This prevents an erroneous request for the service by the user, service server spoofing, and the like to enhance the security performance.

It is preferable that the service server is respectively provided on a per-service basis.

This configuration makes management of the services easy because the services and the service servers correspond one to one.

The present invention also provides a user information management method for managing user information in a user information management system comprising a management server for managing information on a group containing users, user terminals respectively corresponding to the users, and a service server for providing services to the users, the method comprising: a management storing step in which the management server stores user identification information for respectively identifying the users belonging to the group; an identification information notification process step in which whenever a service provided to the users in the group is newly added, the management server transmits to the service server by means of cryptographic communications the user identification information for the users belonging to that group that corresponds to the service being added; and a service storing step in which the service server stores the identification information, received from the management server, for the users corresponding to the service.

With this configuration, the user identification information for respectively identifying the users belonging to the groups is stored in the management server, and whenever services provided to the users in the group are newly added, the user identification information for the users belonging to the group which correspond to the newly added service is transmitted from the management server to the service server by means of cryptographic communications. Therefore, the same user identification information can be transmitted to each of the servers while ensuring security by means of cryptographic communications. As a result, even when a new service is added, the user identification information indicating the same user can be matched among a plurality of services.

The present invention also provides a management server program for operating the management server in any one of the foregoing user information management systems, the management server program causing the management server to function as: the user information storage storing user identification information for respectively identifying the users belonging to the group; and the identification-information notification processor for, whenever a service provided to the users in the group is newly added, transmitting to the service server by means of the cryptographic communications the user identification information for the users belonging to that group that corresponds to the service being added.

The present invention also provides a recording medium storing a management server program for operating the management server in any one of the foregoing user information management systems, the recording medium storing a management server program that causes the management server to function as: the user information storage storing user identification information for respectively identifying the users belonging to the group; and the identification-information notification processor for, whenever a service provided to the users in the group is newly added, transmitting to the service server by means of the cryptographic communications the user identification information for the user belonging to that group that corresponds to the service being added.

The just-described management server program and the just-described storage medium enable a computer to operate as the foregoing management server.

The present invention also provides a user terminal program for operating the user terminals in any one of the foregoing user information management systems, the user terminal program causing the user terminals to function as: the service-key acquisition section for executing a service key acquisition process of accessing the service server providing the services, and acquiring from the service server a service authentication key for receiving provision of a service; and the service-server access section for using the service authentication key to access the service server.

The present invention also provides a recording medium storing a user terminal program for operating the user terminals in any one of the foregoing user information management systems, the recording medium storing a user terminal program that causes the user terminals to function as: the service-key acquisition section for executing a service key acquisition process of accessing the service server providing the services, and acquiring from the service server a service authentication key for receiving provision of a service; and the service-server access section for using the service authentication key to access the service server.

The just-described user terminal program and the just-described recording medium enable a computer to operate as the foregoing user terminal.

The present invention also provides a service server program for operating the service servers in any one of the foregoing user information management systems, the service server program causing the service servers to function as the decryption request processor for receiving an encrypted session password from a user terminal and transmitting the encrypted session password to the management server by means of the cryptographic communications.

The present invention also provides a recording medium storing a service server program for operating the service servers in any one of the foregoing user information management systems, the recording medium storing a service server program that causes the service servers to function as the decryption request processor for receiving an encrypted session password from a user terminal and transmitting the encrypted session password to the management server by means of the cryptographic communications.

The just-described service server program enables a computer to operate as the foregoing service server.

Advantageous Effects of the Invention

The user-information management system, the user-information management method, the program and the recording medium on which it is recorded, for management servers, the program and the recording medium on which it is recorded, for user terminals, and the program and the recording medium on which it is recorded, for service servers, such as described above, make available a user-information management system, a user-information management method, a program and a recording medium on which it is recorded, for management servers, a program and a recording medium on which it is recorded, for user terminals, and a program and a recording medium on which it is recorded, for service servers, for enabling identification information representing the same user to be matched among a plurality of services even when a new service is added.

DETAILED DESCRIPTION OF THE INVENTION

Figure 1:
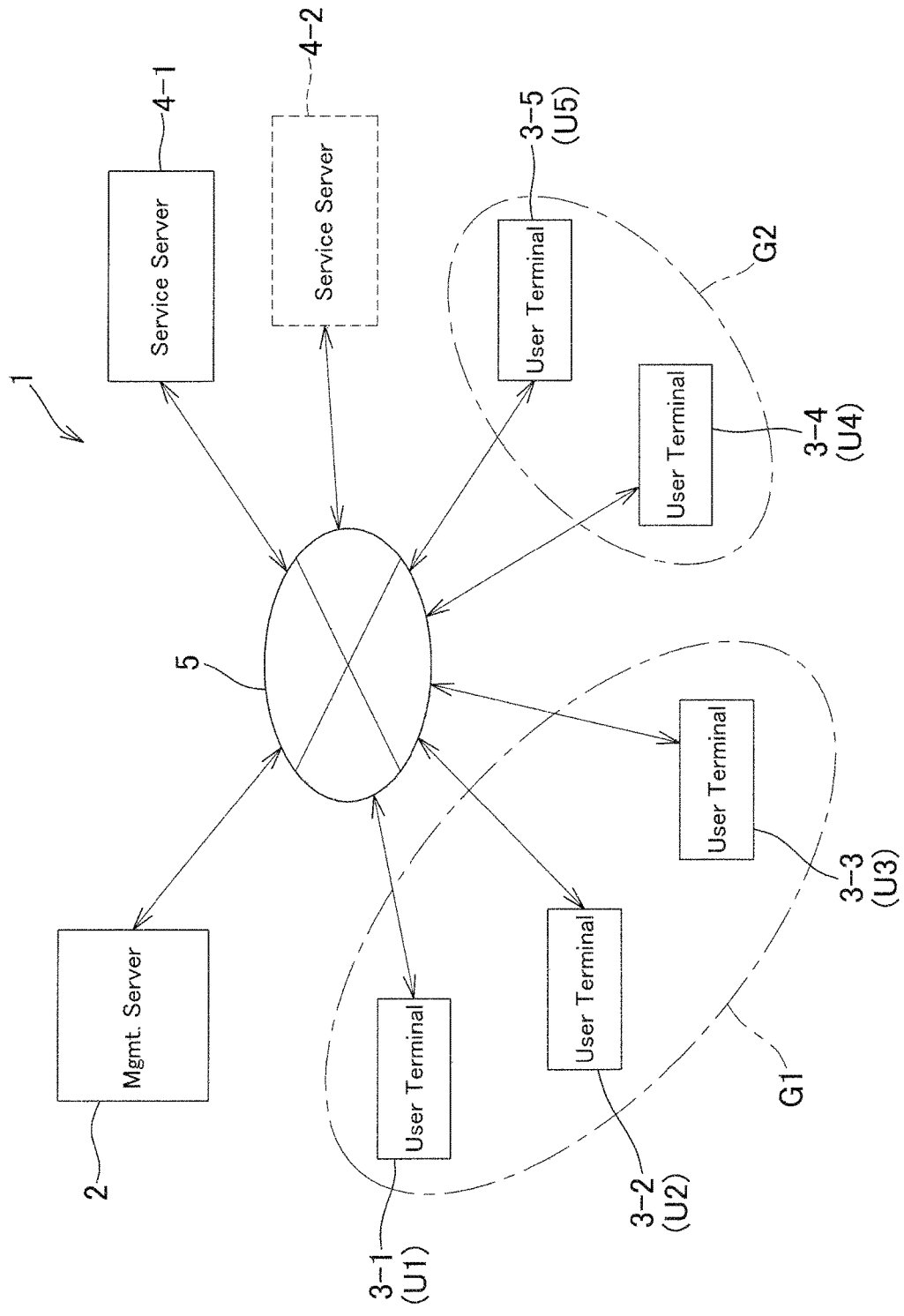
FIG. 1 is a block diagram illustrating an example of the configuration of a user information management system according to one preferred embodiment of the present invention.

Hereinbelow, preferred embodiments of the present invention will be described with reference to the drawings. In the drawings, the same parts and elements are designated by the same reference signs, and the descriptions thereof will not be repeated. FIG. 1 is a block diagram illustrating an example of the configuration of a user information management system according to one preferred embodiment of the present invention. The user information management system 1 shown in FIG. 1 includes a management server 2, user terminals 3-1 to 3-5, and a service server 4-1. Hereinbelow, the user terminals 3-1 to 3-5 may be collectively referred to as a user terminal 3. Likewise, the service server 4-1 and a later-described service server 4-2 may be collectively referred to as a service server 4.

The management server 2, the user terminals 3-1 to 3-5, and the service server 4-1 are configured to enable transmitting and receiving data mutually. The network 5 is a communication network formed of, for example, a WAN (Wide Area Network) such as the Internet, or a LAN (Local Area Network). The network 5 may include a wireless communication network, such as WiFi (Wireless Fidelity) and a mobile telephone network. The user terminal 3 is a terminal device for use by a user.

Examples of the user terminal 3 may include various terminal devices, such as personal computers, tablet terminals, and what is called smartphones. The user terminals 3 are grouped. For example, the user terminals 3-1 to 3-3 belong to a group G1, and the user terminals 3-4 and 3-5 belong to a group G2. In the user information management system 1, each of the users uses a fixed user terminal 3. In the example, the user terminal 3-1 is used by a user U1, the user terminal 3-2 is used by a user U2, and the user terminals 3-3 to 3-5 are used by users U3 to U5, respectively.

The service server 4 provides a predetermined service to the user terminal 3, i.e., to the user who uses the user terminal 3. The service server 4 may provide various kinds of services, such as a storage service, an SNS (Social Networking Service), and online shopping. It is possible that a single service server 4 may provide a plurality of services may be provided either by a single service server 4, or a plurality of service servers 4 may be provided respectively for a plurality of services.

The management server 2 manages information that is necessary for carrying out cryptographic communications between the user terminal 3 and the service server 4 via the network 5, such as encryption keys, authentication keys, and user identification information (e.g., serial numbers).

Figure 2:
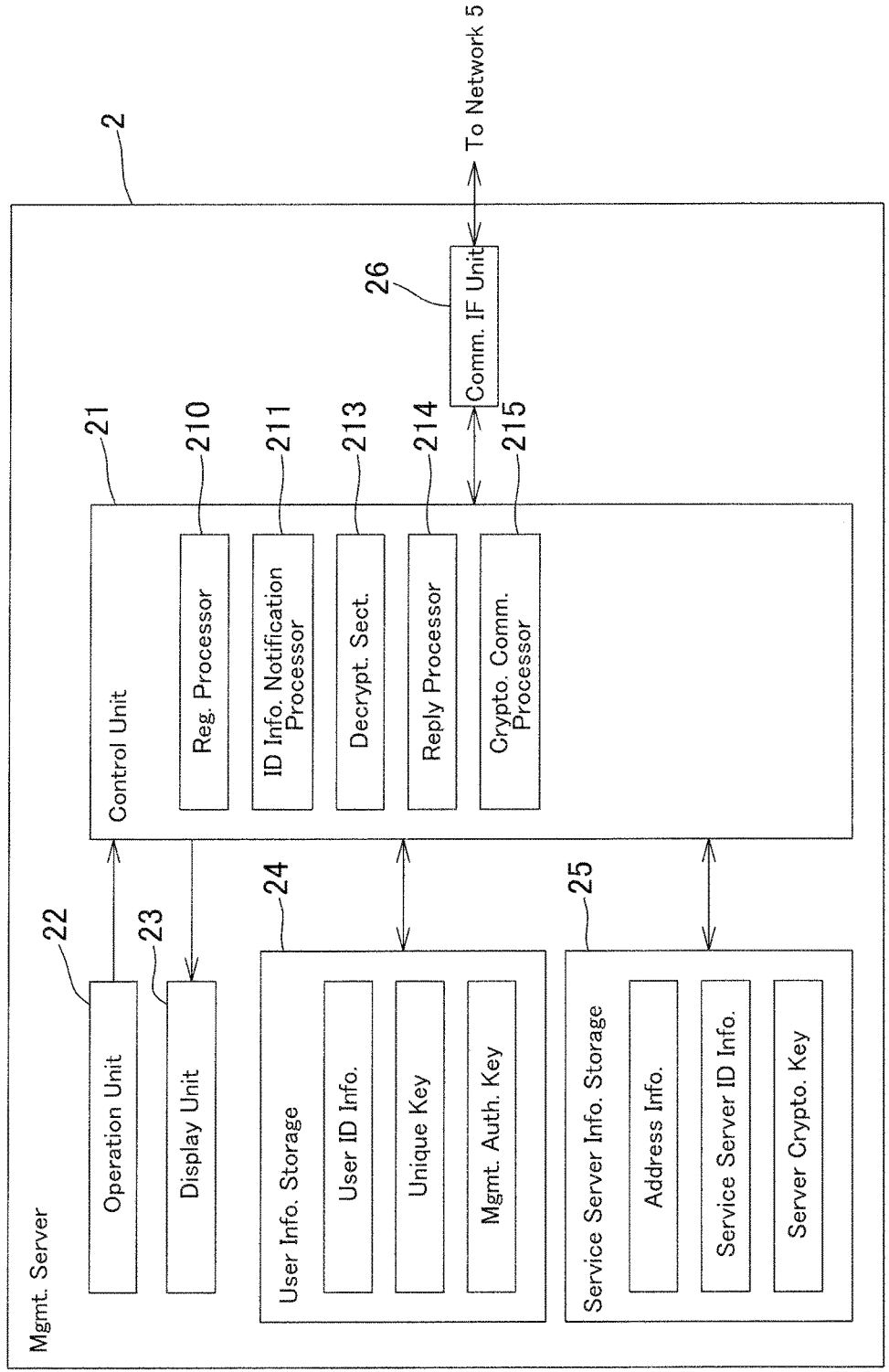
FIG. 2 is a block diagram illustrating an example of the configuration of a management server shown in FIG. 1.

FIG. 2 is a block diagram illustrating an example of the configuration of the management server 2 shown in FIG. 1. The management server 2 shown in FIG. 1 includes a control unit 21, an operation unit 22, a display unit 23, user information storage 24, service server information storage 25, and a communication IF (interface) unit 26.

The operation unit 22 is, for example, an operation input device, such as a keyboard, a mouse, or a touchscreen. The display unit 23 is, for example, a display device, such as a liquid crystal display device. The communication IF unit 26 is a communication interface circuit for carrying out communications via the network 5. For the sake of brevity in illustration, the following explanation omits the description of the communication IF unit 26.

Each of the user information storage 24 and the service server information storage 25 is constructed by using a HDD (hard disk drive) device.

The user information storage 24 stores user identification information for identifying each of the users belonging to the groups G1 and G2. The user information storage 24 also stores unique keys, which are cryptographic keys for decrypting encrypted information encrypted by the user terminals 3-1 to 3-5 to carry out cryptographic communications with the user terminals 3-1 to 3-5, and management authentication keys, which are for authenticating the users, in such a manner that the keys correspond to the respective users (i.e., the respective user terminals 3). The unique keys are individually given to the respective users. The user identification information, the unique keys, and the management authentication keys are, for example, communicated between the management server 2 and the user terminals 3 via the network 5, or input by the user operating the operation unit 22, so that they are stored in the user information storage 24 in advance.

The service server information storage 25 stores address information for accessing the service server 4. The service server information storage 25 also stores service server identification information for identifying the service server 4 connected to the network 5, that is, the service server 4 that can provide a service to the users (i.e., the user terminals). The service server information storage 25 also stores server cryptographic keys, which are cryptographic keys for carrying out cryptographic communications with the service server 4. The address information, the service server identification information, and the server cryptographic keys are, for example, communicated between the management server 2 and the service server 4 via the network 5, or input through the operation unit 22 operated by the user, so that they are stored in the service server information storage 25 in advance.

The control unit 21 includes a CPU (Central Processing Unit) for executing predetermined arithmetic operations, a RAM (Random Access Memory) for temporarily storing data, a non-volatile storage unit such as a HDD or a ROM (Read Only Memory) for storing, for example, a management server program according to a preferred embodiment of the present invention, and peripheral circuits thereof. By executing a management server program stored in the storage, for example, the control unit 21 functions as a registration processor 210, an identification-information notification processor 211, a decryption section 213, a reply processor 214, and a cryptographic communication processor 215.

The management server program may be stored in a recording medium, such as a USB (Universal Serial Bus) memory, a CD-ROM, or a DVD-ROM. The management server 2 may be configured to be capable of reading the recording medium and to execute the management server program that has been read from the recording medium. The recording medium is configured to be readable by a computer connected to the network 5, and the management server 2 may be configured to download, via the network 5, the management server program that is read out by the computer from the recording medium 2.

Upon providing the service, the service server 4 transmits, to the management server 2, service information indicating the service to be provided, and service server identification information indicating each service server 4. When the service servers 4 are respectively provided on a per-service basis, the service server identification information may be used as the service information. The user information management system 1 shown in FIG. 1 shows an example in which the service servers 4 are respectively provided on a per-service basis.

The registration processor 210 performs the process of registering users, groups, services, and the like.

Whenever the service provided to the users belonging to the groups are added, for example, when a service provided to the users belonging to the group G1 is added, the identification-information notification processor 211 transmits the user identification information for the users belonging to the group G1 to the service server 4 that provides the service by means of cryptographic communications.

The decryption section 213 decrypts the encrypted information encrypted at the user terminals 3 based on the unique keys of the users, which are stored in the user information storage 24.

The reply processor 214 causes the decryption section 213 to decrypt a session password transmitted from the service server 4, and causes the cryptographic communication processor 215 to transmit the decrypted session password to the service server 4 by means of cryptographic communications.

The cryptographic communication processor 215 carries out cryptographic communications with the user terminals 3 or with the service server 4, in which it encrypts information and transmits the encrypted information and it receives encrypted information and decrypts the information, using a unique key stored in the user information storage 24 or a server cryptographic key stored in the service server information storage 25. The cryptographic communication processor 215 may generate an OTP (One Time Password) based on a cryptographic key such as a unique key or a server cryptographic key and carry out cryptographic communications based on the OTP.

Figure 3:
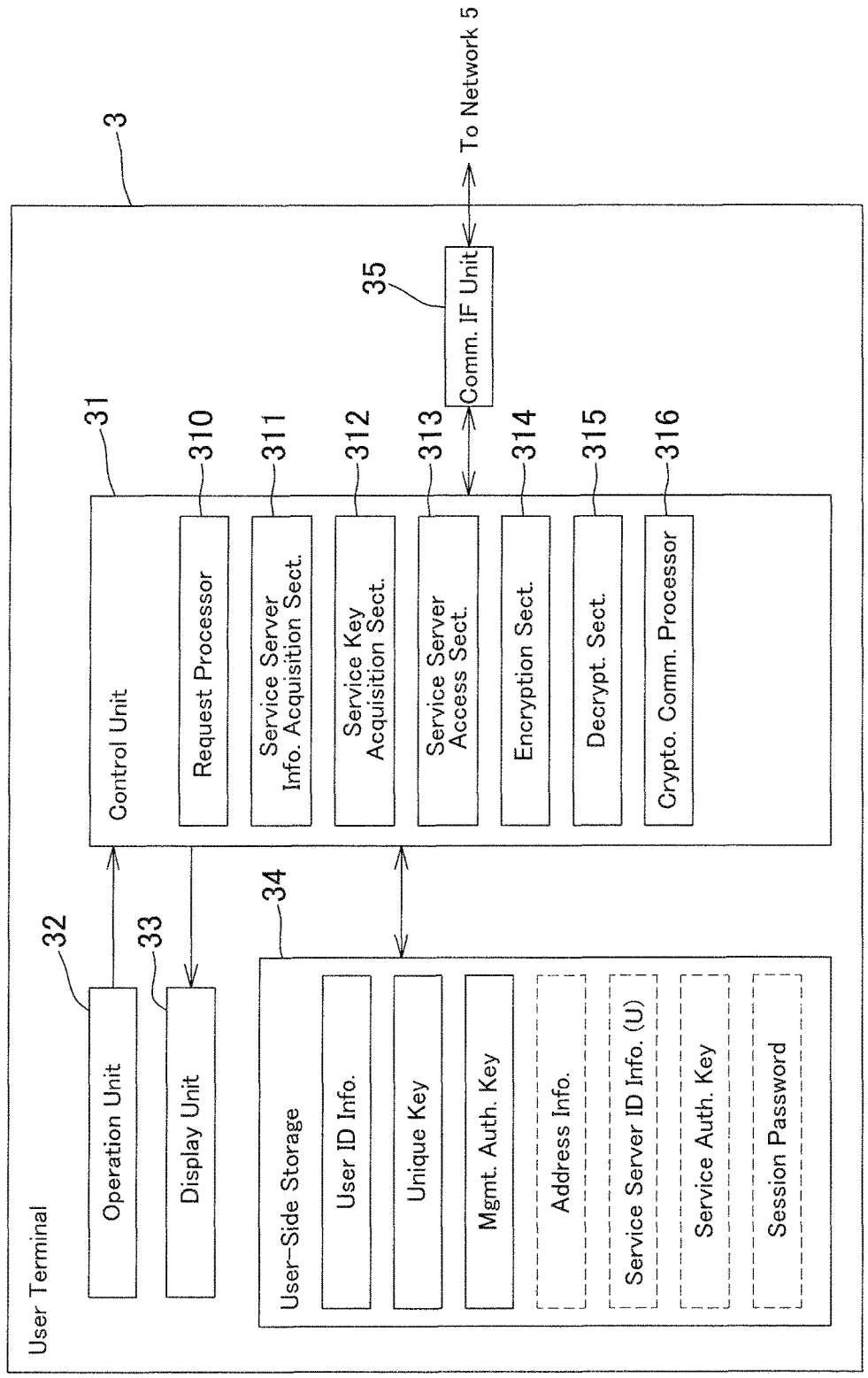
FIG. 3 is a block diagram illustrating an example of the configuration of a user terminal shown in FIG. 1.

FIG. 3 is a block diagram illustrating an example of the configuration of a user terminal 3 shown in FIG. 1. The user terminal 3 shown in FIG. 3 includes a control unit 31, an operation unit 32, a display unit 33, user side storage 34, and a communication IF unit 35.

The operation unit 32 is, for example, an operation input device, such as a keyboard, a mouse, or a touchscreen. The display unit 33 is, for example, a display device, such as a liquid crystal display device. The communication IF unit 35 is a communication interface circuit for carrying out communications via the network 5. For the sake of brevity in illustration, the following explanation omits the description of the communication IF unit 35.

The user side storage 34 is constructed by, for example, using a HDD device. The user side storage 34 stores user identification information for identifying the user, a management authentication key used by the management server 2 to authenticate the user, and a unique key that is unique to the user to carry out cryptographic communications with the management server 2. The user identification information, the unique key, and the management authentication key are, for example, automatically generated when a control program is installed in the user terminal 3, or communicated between the user terminal 3 and the management server 2 via the network 5, or input through the operation unit 32 by the user, so that they are stored in the user information storage 34 in advance.

The control unit 31 includes a CPU for executing predetermined arithmetic operations, a RAM for temporarily storing data, a non-volatile storage unit, such as a HDD or a ROM, for storing, for example, a management server program according to a preferred embodiment of the present invention, and peripheral circuits thereof. By executing a user terminal program stored in the storage unit, for example, the control unit 31 functions as a request processor 310, a service-server information acquisition section 311, a service-key acquisition section 312, a service server access section 313, an encryption section 314, a decryption section 315, and a cryptographic communication processor 316.

The user terminal program may be stored in a recording medium, such as a USB memory, a CD-ROM, or a DVD-ROM. The user terminal 3 may be configured to be capable of reading the recording medium and to execute the user terminal program that has been read from the recording medium. The recording medium is configured to be readable by a computer connected to the network 5, and the user terminal 3 may be configured to download, via the network 5, the user terminal program that is read out by the computer from the recording medium 2.

The request processor 310 performs a registration request to the management server 2. The service-server information acquisition section 311 receives the address information, which is stored in the service server information storage 25, from the management server 2, and stores the received address information in the user side storage 34. This enables the user terminal 3 to access the service server 4.

The service-key acquisition section 312 accesses the service server 4 that provides the service using the address information acquired by the service-server information acquisition section 311, and executes a service key acquisition process of acquiring, from the service server 4, a service authentication key for receiving provision of the service.

The service server access section 313 accesses the service server 4, using the address information that is acquired by the service-server information acquisition section 311 and the service authentication key that is acquired by the service-key acquisition section 312.

In the service key acquisition process of the service-key acquisition section 312, the encryption section 314 executes the process of a first step of encrypting a session password to be used in encryption by the service server 4 using an encryption key (i.e., a unique key) stored in the user side storage 34 so that the session password can be decrypted by the decryption section 213 of the management server 2, and causing the communication IF unit 35 to transmit the encrypted session password to the service server 4.

In the service key acquisition process of the service-key acquisition section 312, the decryption section 315 decrypts the service authentication key that has been encrypted by a service key transmission section 412 with a session password, with the use of the session password stored in the user side storage 34, and stores the service authentication key in the user side storage 34.

The cryptographic communication processor 316 performs cryptographic communications with the service server 2 or with the service server 4. The cryptographic communication processor 316 may generate an OTP based on a cryptographic key such as a unique key or a server cryptographic key and carry out cryptographic communications based on the OTP.

Figure 4:
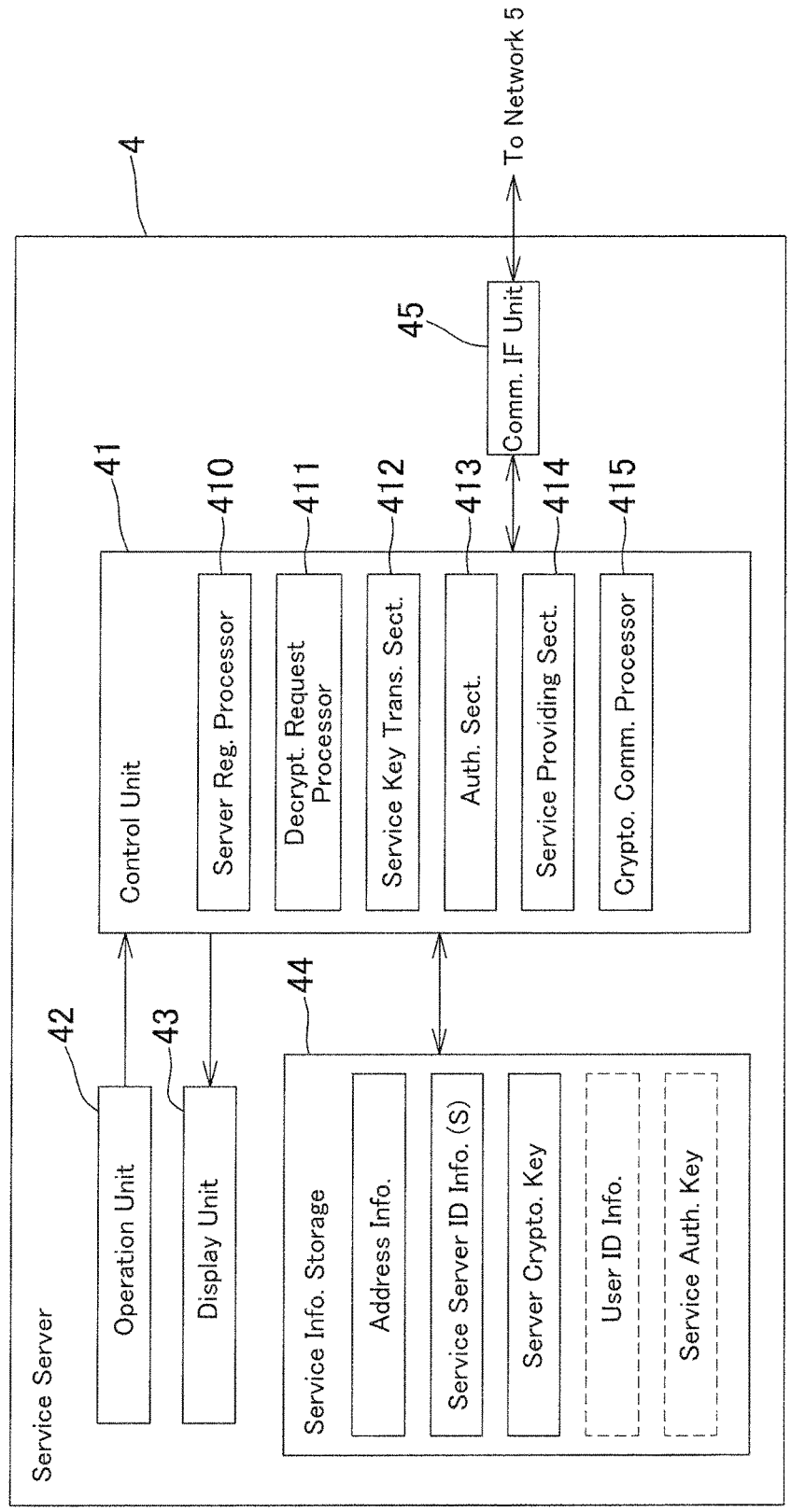
FIG. 4 is a block diagram illustrating an example of the configuration of a service server shown in FIG. 1.

FIG. 4 is a block diagram illustrating an example of the configuration of a service server 4 shown in FIG. 1. The user terminal 4 shown in FIG. 4 includes a control unit 41, an operation unit 42, a display unit 43, service information storage 44, and a communication IF unit 45.

The operation unit 42 is, for example, an operation input device, such as a keyboard, a mouse, or a touchscreen. The display unit 43 is, for example, a display device, such as a liquid crystal display device. The communication IF unit 45 is a communication interface circuit for carrying out communications via the network 5. For the sake of brevity in illustration, the following explanation omits the description of the communication IF unit 45.

The service information storage 44 is constructed by, for example, using a HDD device. The service server information storage 44 stores address information such as network address for accessing the service server 4, service server identification information for identifying the service server 4, and the like, in advance. The service information storage 44 stores the user identification information for the users corresponding to the service, which is received from the identification-information notification processor 211 of the management server 2. The service server information storage 44 also stores a server cryptographic key, which is a cryptographic key for carrying out cryptographic communications with the management server 2.

Note that the service server identification information for identifying the service server itself is referred to as service server identification information (S) to discriminate it from later-described service server identification information (U) that is stored in the user terminal 3.

The control unit 41 includes a CPU for executing predetermined arithmetic operations, a RAM for temporarily storing data, a non-volatile storage unit such as a HDD or a ROM for storing, for example, a service server program according to a preferred embodiment of the present invention, and peripheral circuits thereof. By executing a service server program stored in the storage unit, for example, the control unit 41 functions as a server registration processor 410, a decryption request processor 411, a service key transmission section 412, an authentication section 413, a service providing section 414, and a cryptographic communication processor 415.

The service server program may be stored in a recording medium, such as a USB memory, a CD-ROM, or a DVD-ROM. The service server 4 may be configured to be capable of reading the recording medium and to execute the service server program that has been read from the recording medium. The recording medium is configured to be readable by a computer connected to the network 5, and the service server 4 may be configured to download, via the network 5, the service server program that is read out by the computer from the recording medium 2.

The server registration processor 410 registers the service server 4 on the management server 2 as a service server that can provide a service.

The decryption request processor 411 receives an encrypted session password from a user terminal 3, and causes the cryptographic communication processor 415 to transmit the encrypted session password to the management server 2. This enables the management server 2 to decrypt the session password.

The service key transmission section 412 encrypts the service authentication key, which allows the user terminal 3 to receive the service, using the session password that is decrypted at the management server 2, and transmits the encrypted session password to the user terminal 3. This enables the user terminal 3 that has received the service authentication key to receive the service of the service server 4.

When accessed by a user terminal 3, the authentication section 413 acquires the user identification information and the service authentication key of the user terminal 3 from the user terminal 3. If the acquired user identification information matches any of the user identification information for a plurality of users stored in the service information storage 44, the authentication section 413 authenticates the user terminal 3 using the acquired service authentication key.

If the authentication by the authentication section 413 has succeeded, the service providing section 414 provides the service to the user terminal 3 for which the authentication has succeeded.

The cryptographic communication processor 415 carries out cryptographic communications with the management server 2 or with the user terminal 3. The cryptographic communication processor 415 may generate an OTP based on a cryptographic key such as a unique key or a server cryptographic key and carry out cryptographic communications based on the OTP.

Cryptographic communications based on the unique key and authentication based on the management authentication key are carried out between the cryptographic communication processor 215 of the management server 2 and the cryptographic communication processor 316 of the user terminal 3. Cryptographic communications based on the server cryptographic key are carried out between the cryptographic communication processor 215 of the management server 2 and the cryptographic communication processor 415 of the service server 4. Hereinbelow, the processes performed by the cryptographic communication processing sections 215, 316, and 415 are described simply as carrying out cryptographic communications. In the example illustrated here, the cryptographic communication processing sections 215, 316, and 415 perform common-key cryptographic communications. However, it is also possible that the cryptographic communication processing sections 215, 316, and 415 perform public-key cryptographic communications.

Next, an example of the operation of the user information management system 1 configured as described above will be described. First, a registration operation of the group (cloud space) with the user information management system 1 will be described. The users U1 to U5 of the user terminals 3-1 to 3-5 are registered as members of the user information management system 1. The user side storage 34 of each of the user terminals 3-1 to 3-5 stores the user identification information, the unique key, and the management authentication key corresponding to each of the users. The user information storage 24 of the management server 2 stores the user identification information, the unique keys, and the management authentication keys respectively corresponding to the users U1 to U5. The service server information storage 25 stores the address information, the service server identification information, and the server cryptographic key of the service server 4-1 that provides an available service A.

Figure 5:
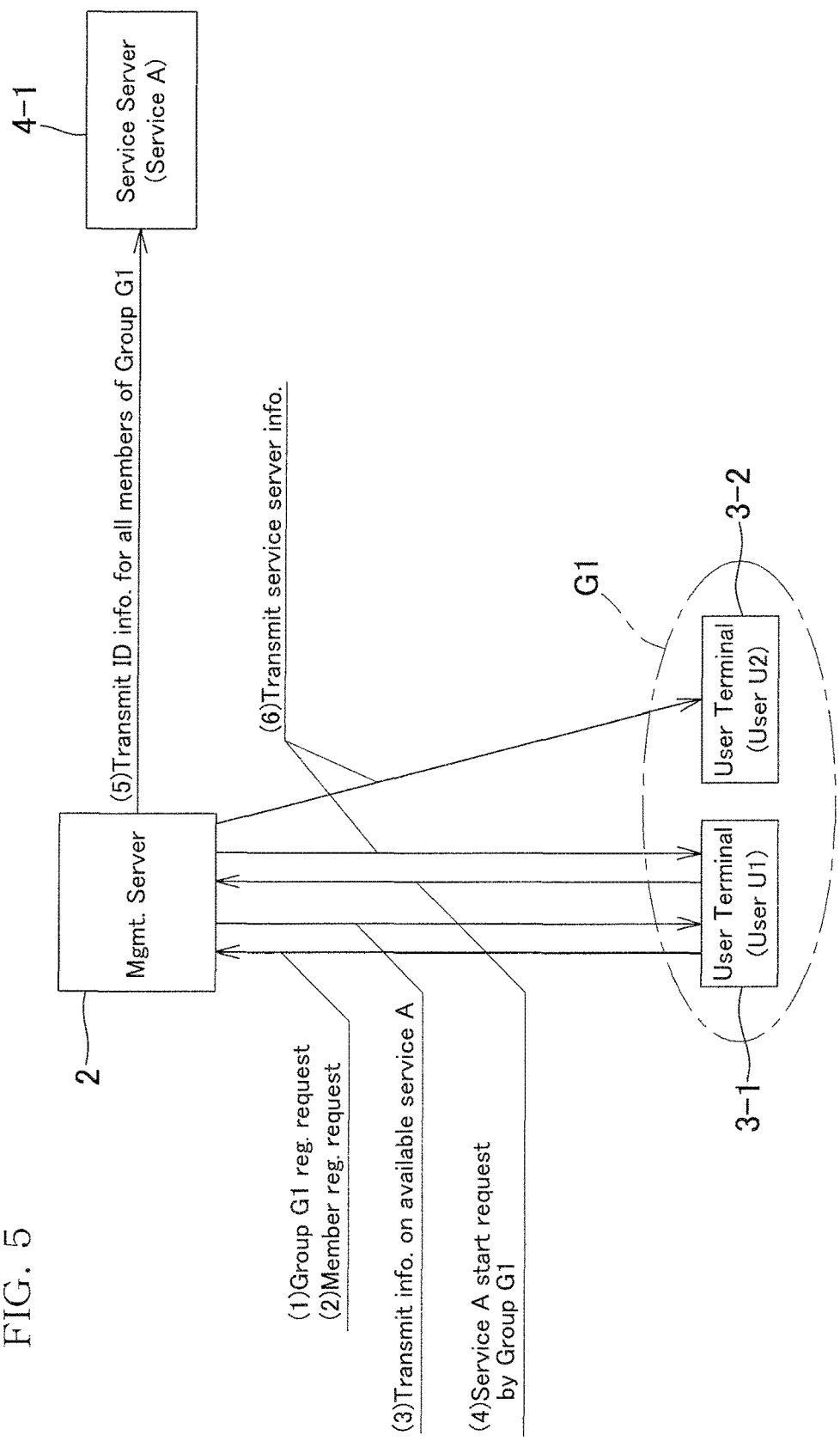
FIG. 5 is an illustrative view for illustrating an operation of registering a group on a user information management system.

FIG. 5 is an illustrative view for illustrating the operation of registering groups on the user information management system 1. First, when the user U1 inputs a registration request of the group G1 by operating the operation unit 32 of the user terminal 3-1, the process of "(1) group G1 registration request" is executed. Specifically, in the "(1) group G1 registration request", the request processor 310 transmits the registration request of the group G1 and the user identification information for the user U1 to the management server 2 by means of cryptographic communications.

In the management server 2, upon receiving the registration request of the group G1 and the user identification information for the user U1, the registration processor 210 registers the group G1 and stores the user U1 (the user identification information thereof) in the user information storage 24 as a member and an administrator of the group G1.

Next, when the user U1 inputs a registration request of the user U2 as a member of the group G1 by operating the operation unit 32 of the user terminal 3-1, "(2) member registration request" is executed. Specifically, in the "(2) member registration request", the request processor 310 transmits the registration request of the user U2 with the group G1 and the user identification information for the user U2 to the management server 2.

In the management server 2, upon receiving the registration request of the user U2 with the group G1 and the user identification information for the user U2, the registration processor 210 stores the user U2 (the user identification information thereof) in the user information storage 24 as a member of the group G1. As a result, as illustrated in FIG. 5, the user terminals 3-1 and 3-2 (the users U1 and U2) become the members of the group G1.

Next, the registration processor 210 of the management server 2 looks up the service server information storage 25 and performs the process of "(3) transmitting the information of available service A". Specifically, the registration processor 210 transmits the address information and the service server identification information for the service server 4-1, which provides the service A, to the user terminal 3-1 by means of cryptographic communications. Then, the service A is selectably displayed, for example, on the display unit 33 of user terminal 3-1.

When the user U1 wishes to receive the service A as the group G1, the user U1 inputs a start request for the service A by the group G1 by operating the operation unit 32 of the user terminal 3-1. Then, "(4) service A start request by group G1" is transmitted by the request processor 310 to the management server 2 by means of cryptographic communications. Thereby, the service provided to the users in the group G1 is added.

In the management server 2, the user identification information for the users U1 and U2, which is stored in the user information storage 24, is read out by the identification-information notification processor 211, and the process of "(5) transmitting the identification information for all the members of the group G1" is executed. As a result, the identification information for all the members of the group G1, the users U1 and U2, is transmitted by the identification-information notification processor 211 to the service server 4-1 by means of cryptographic communications. With the above-described processes (4) and (5), each time a service provided to the users in the group G1 is newly added, the user identification information for the users belonging to the group which corresponds to the added service is transmitted to the service server by means of cryptographic communications.

At the service server 4-1, the user identification information for the users U1 and U2 is received and stored in the service information storage 44.

Next, the management server 2 executes the process of "(6) service server information transmission". Specifically, the registration processor 210 of the management server 2 reads out the address information and the service server identification information for the service server 4-1 (service A) from the service server information storage 25 and transmits the address information and the service server identification information to the user terminals 3-1 and 3-2 corresponding to the users U1 and U2, i.e., all the members of the group G1.

The transmitted address information and the transmitted service server information are received by the service server identification information acquisition section 311 of each of the user terminals 3-1 and 3-2 and stored in the user side storage 34. This allows the users U1 and U2 of the user terminals 3-1 and 3-2 to know that the service server 4-1 (service A) is available. The service server identification information that is stored in the user side storage 34 is referred to as service server identification information (U), in order to discriminate it from the service server identification information (S) that is stored in the service server 4.

Figure 6:
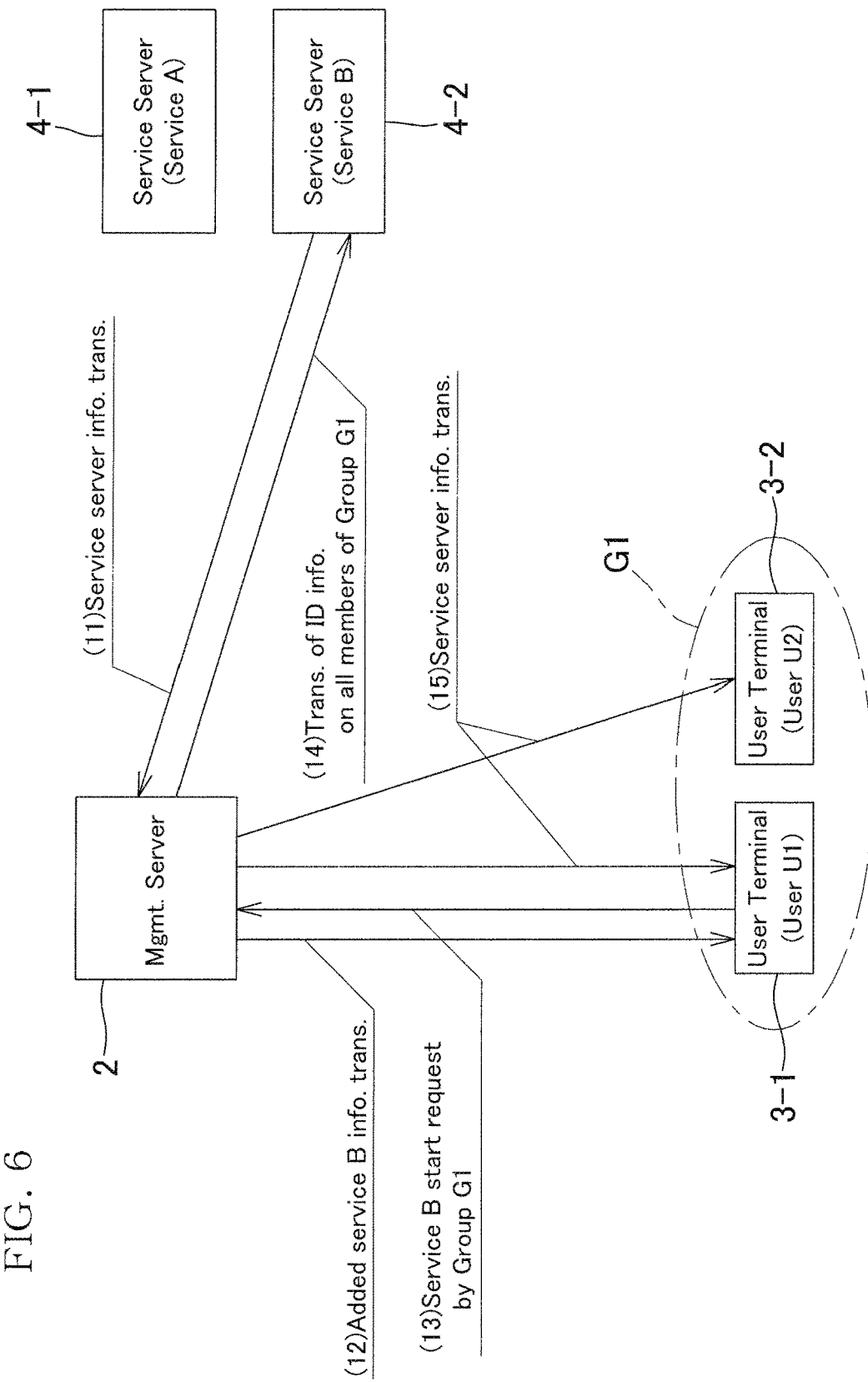
FIG. 6 is an illustrative view for illustrating an example of the operation of the user information management system when adding a newly available service.

FIG. 6 is an illustrative view for illustrating an example of the operation of the user information management system 1 when adding a new available service. First, the service server 4-2, which provides a service B, is connected to the network 5, and the server registration processor 410 of the service server 4-2 executes the process of "(11) service server information transmission". Specifically, the server cryptographic key is distributed between the cryptographic communication processor 215 of the management server 2 and the cryptographic communication processor 415 of the service server 4-2 to allow cryptographic communications between the management server 2 and the service server 4-2. Thereafter, the server registration processor 410 transmits the address information, the service server identification information, and the information indicating the service B that are stored in the service information storage 44 to the management server 2 by means of cryptographic communications.

Then, at the management server 2, the address information and the service server identification information for the service server 4-2 (service B) is stored in the service server information storage 25.

Next, the registration processor 210 of the management server 2 looks up the service server information storage 25 and performs the process of "(12) added service B information transmission". Specifically, the registration processor 210 transmits to the user terminal 3-1 of the user U1, who is the administrator of the group G1, the address information and the service server identification information for the service server 4-2, which provides the service B, by means of cryptographic communications. Then, the service B is selectably displayed, for example, on the display unit 33 of user terminal 3-1.

When the user U1, who is the administrator of the group G1, wishes to receive the service B as the group G1, the user U1 inputs a start request for the service B by the group G1 by operating the operation unit 32 of the user terminal 3-1. Then, "(13) service B start request by group G1" is transmitted by the request processor 310 to the management server 2 by means of cryptographic communications. Thereby, the service B provided to the users in the group G1 is added.

In the management server 2, the user identification information for the users U1 and U2, which is stored in the user information storage 24, is read out by the identification-information notification processor 211, and the process of "(14) transmitting the identification information for all the members of the group G1" is executed. As a result, the identification information for all the members of the group G1, the users U1 and U2, is transmitted by the identification-information notification processor 211 to the service server 4-2 by means of cryptographic communications. With the above-described processes (11) to (14), each time a service provided to the users in the group G1 is newly added, the user identification information for the users belonging to the group which corresponds to the added service is transmitted to the service server by means of cryptographic communications.

At the service server 4-2, the user identification information for the users U1 and U2 is received and stored in the service information storage 44.

In this case, the user identification information for the users U1 and U2 that is transmitted to the service server 4-2 in the process (14) is the one read out from the user information storage 24, as in the case of the process (5). Therefore, the user identification information for the users U1 and U2 that is transmitted to the service server 4-1 in the process (5) and the user identification information for the users U1 and U2 that is transmitted to the service server 4-2 in the process (14) are identical to each other. Thus, even when a new servicing is added, the user identification information indicating the same user can be matched among a plurality of services, for example, between a plurality of service servers.

Next, the management server 2 executes the process of "(15) service server information transmission". Specifically, the registration processor 210 of the management server 2 reads out the address information and the service server identification information for the added service server 4-2 (service B) from the service server information storage 25 and transmits the address information and the service server identification information to the user terminals 3-1 and 3-2 corresponding to the users U1 and U2, i.e., all the members of the group G1.

The transmitted address information and the transmitted service server information are received by the service server identification information acquisition section 311 of each of the user terminals 3-1 and 3-2 and stored in the user side storage 34. This allows the users U1 and U2 of the user terminals 3-1 and 3-2 to know that the service server 4-2 (service B) is available.

Figure 7:
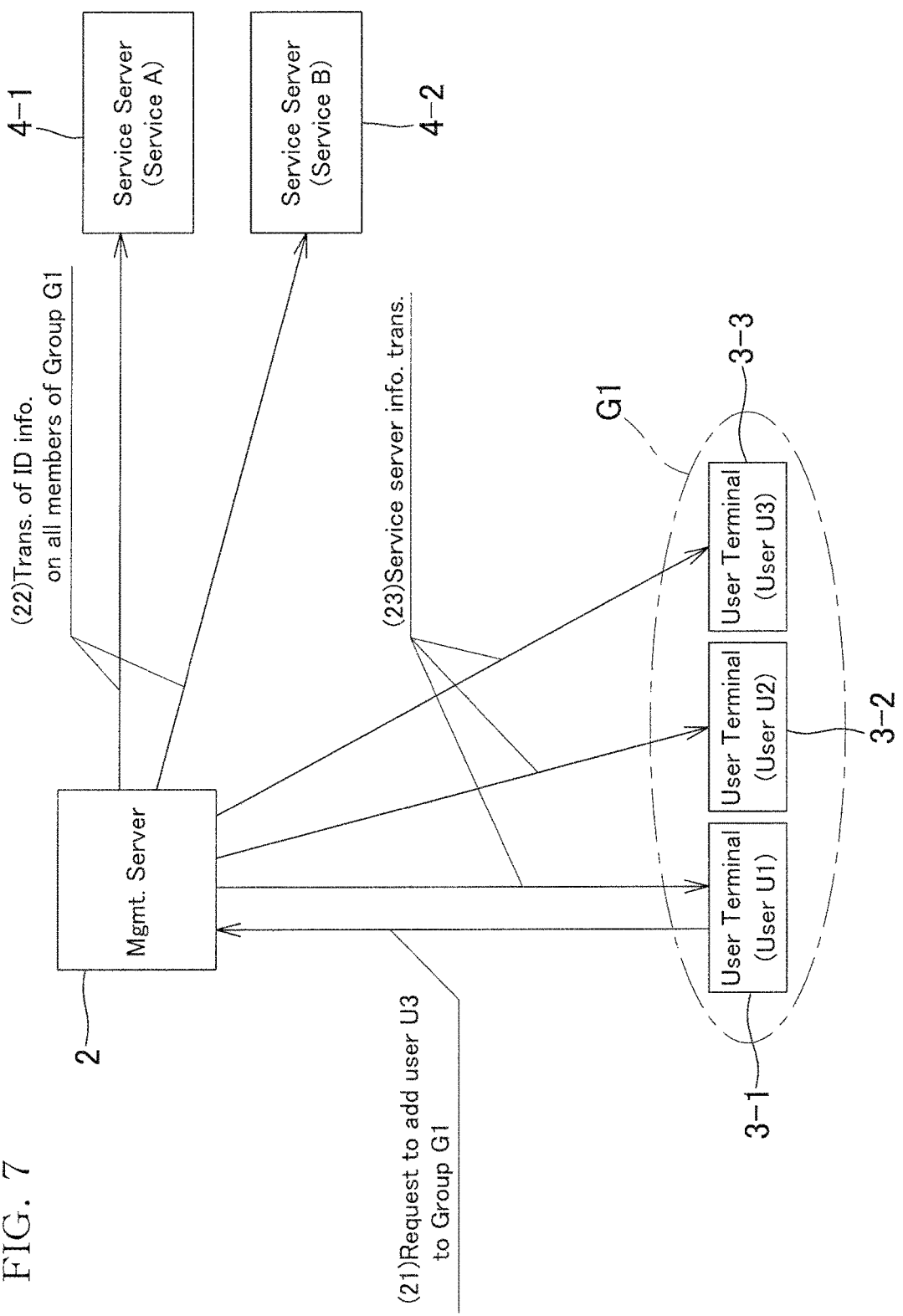
FIG. 7 is an illustrative view for illustrating an example of the operation of the user information management system when a member belonging to a group is added.

FIG. 7 is an illustrative view for illustrating an example of the operation of the user information management system 1 when a member belonging to the group G1 is added. When adding a user terminal 3-3 (user U3) to the group G1, the user U1, who is the administrator of the group G1, inputs an addition request of the user U3 to the group G1 by operating the operation unit 32 of the user terminal 3-1. Then, a "(21) request to add user U3 to group G1" is transmitted by the request processor 310 to the management server 2 by means of cryptographic communications. Specifically, the request processor 310 transmits the registration request of the user U3 with the group G1 and the user identification information for the user U3 to the management server 2.

When the management server 2 receives the "(21) request to add user U3 to group G1", the registration processor 210 stores the user U3 (the user identification information thereof) in the user information storage 24 as a member of the group G1. As a result, as illustrated in FIG. 7, the user terminals 3-1, 3-2, and 3-3 (the users U1, U2, and U3) become the members of the group G1.

Next, in the management server 2, the user identification information for the users U1, U2, and U3, which is stored in the user information storage 24, is read out by the identification-information notification processor 211, and the process of "(22) transmitting of the identification information for all the members of the group G1" is executed. As a result, the identification information for all the members of the group G1, the users U1, U2, and U3, is transmitted by the identification-information notification processor 211 to the service servers 4-1 and 4-2 corresponding to all the services made available to the group G1 by means of cryptographic communications. With the above-described processes (21) and (22), each time a user is newly added to the group G1, the user identification information for the added user is transmitted to the service servers that provide the services available to the group G1 by means of cryptographic communications.

At each of the service servers 4-1 and 4-2, the user identification information for the users U1, U2, and U3 is received and stored in the respective service information storage 44. In the above-described process (22), it is possible to transmit the user identification information for only the newly added user, not that for all the members. In addition, it is not always necessary to execute the process (22), and for example, it is possible that the user identification information for the added member may be separately transmitted to each of the service servers 4.

Next, the management server 2 executes the process of "(23) service server information transmission". Specifically, the registration processor 210 of the management server 2 reads out the address information and the service server identification information for all the service servers 4-1 and 4-2 (services A and B) from the service server information storage 25 and transmits the address information and the service server identification information to the user terminals 3-1, 3-2, and 3-3 corresponding to the users U1, U2, and U3, i.e., all the members of the group G1.

The transmitted address information and the transmitted service server information are received by the service server identification information acquisition section 311 of each of the user terminals 3-1, 3-2, and 3-3 and stored in the user side storage 34. This allows the users U1, U2, and U3 of the user terminals 3-1, 3-2, and 3-3 to know that the service servers 4-1 and 4-2 (services A and B) are available.

In this case, with the above-described processes (21) to (23), by merely adding the user U3 to the group G1 in the process (21), the information of the new user U3 can be registered on the service servers 4-1 and 4-2, which correspond to all the services A, B available to the group G1, and moreover, the user U3 is allowed to know all the available services A, B.

In the above-described process (23), it is also possible to transmit the server information only to the user terminal 3-3 corresponding to the newly added user U3, not to all the members.

Figure 8:
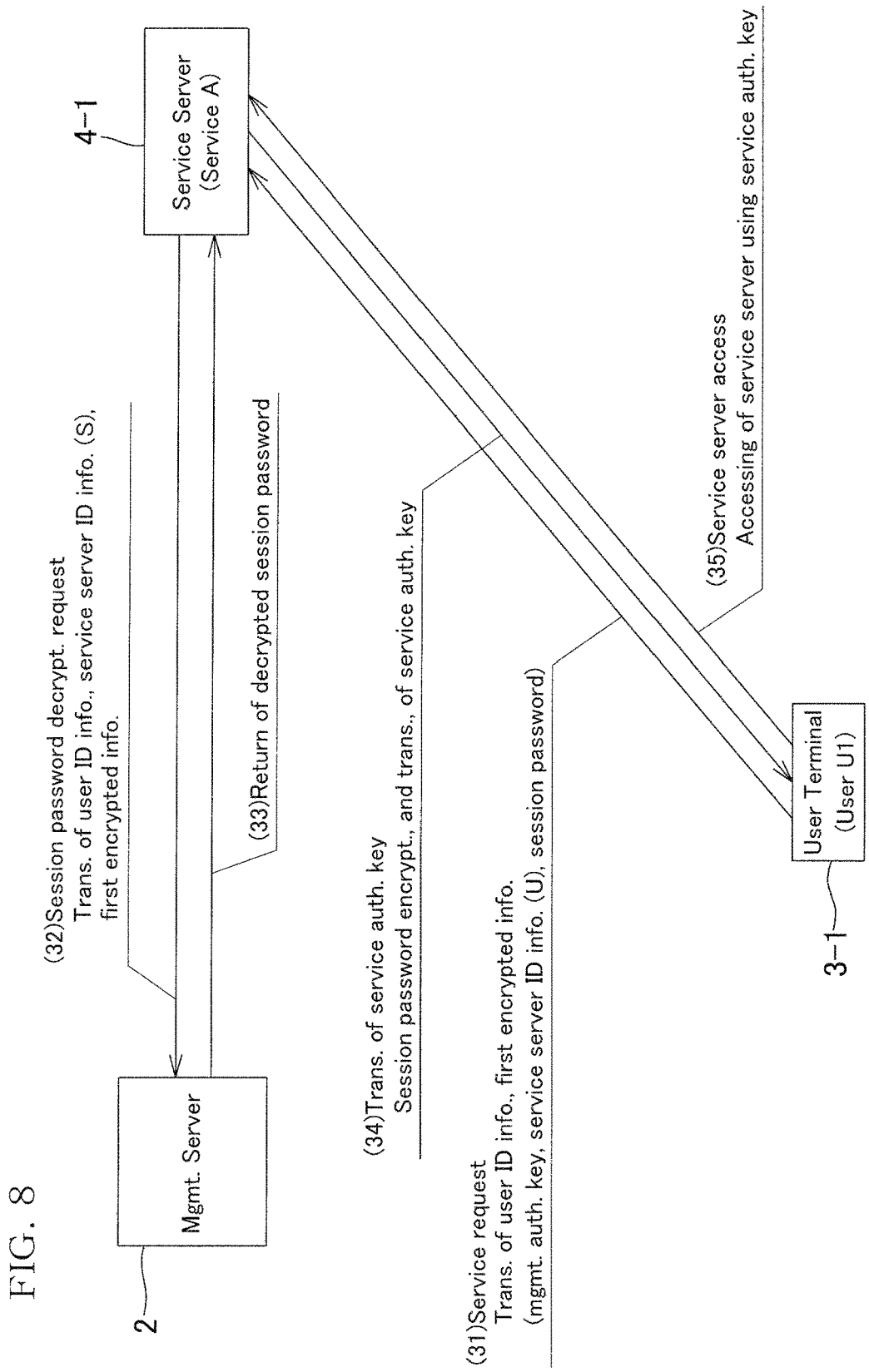
FIG. 8 is an illustrative view for illustrating an example of the operation from making a request for a service until reception of the service.

FIG. 8 is an illustrative view for illustrating an example of the operation from the time when a user (user terminal 3) who has received the information about the available service (service server) in the above-described process (23) makes a request for the service until the user receives the service. FIG. 8 illustrates an example in which the user U1 receives the service A from the service server 4-1 using the user terminal 3-1. The user terminals 3-2 to 3-5 and the service servers 4-2 operate in the same manner as the user terminal 3-1 and the service server 4-1. Therefore, the description thereof will be omitted.

First, when the user U1 carries out a request operation for the service A (service server 4-1) by operating the operation unit 32 of the user terminal 3-1, the process of "(31) service request" is executed. Specifically, the "(31) service request" is executed in the following manner. First, the service-key acquisition section 312 generates a session password that is used for encryption when the service server 4 transmits the service authentication key to the user terminal 3-1, and stores the session password in the user side storage 34. The session password may be generated in various ways. For example, the session password may be generated using a random number, input by the user U1 by operating the operation unit 32, or stored in the user side storage 34 in advance.

Next, the service-key acquisition section 312 reads out the management authentication key, the service server identification information (U), and the session password from the user side storage 34, and encrypts these pieces of information with the encryption section 314 in such a manner that the information can be decrypted by the decryption section 213 of the management server 2. Specifically, the encryption section 314 carries out encryption based on the unique key stored in the user side storage 34 of the user terminal 3-1, for example, encryption with the use of a one-time password based on the unique key. The information encrypted in this manner is referred to as first encrypted information.

As described previously, the user information storage 24 of the management server 2 stores the unique keys of the user terminals 3. Therefore, the first encrypted information, which is encrypted based on the unique key stored in the user side storage 34 of the user terminal 3-1, can be decrypted by the decryption section 213 of the management server 2. On the other hand, because the unique keys are not stored in the service server 4, the first encrypted information, which is encrypted based on the unique key, cannot be decrypted by the service server 4. Thus, the unique keys are not allowed to be stored in the service servers 4, but the unique keys are stored only in the management server 2 and the user terminals 3. As a result, security can be enhanced even when the service (service server 4) is provided by, for example, a third-party vendor.

Next, the service-key acquisition section 312 reads out the user identification information for the user U1 and the address information of the service server 4-1 from the user side storage 34, and using the address information, the service-key acquisition section 312 transmits the first encrypted information and the user identification information for the user U1 to the service server 4-1. Thus, the request for the service A (service server 4-1) by the user U1 (user terminal 3-1) is executed.

As described previously, because the unique keys are not stored in the service server 4, the user terminal 3 cannot carry out cryptographic communications with the service server 4 based on the unique key. For this reason, the user identification information for the user U1 is transmitted without being encrypted. This enables the service server 4 to recognize the user identification information for the user U1.

Next, when the service server 4-1 receives the user identification information for the user U1 and the first encrypted information, the decryption request processor 411 checks whether or not the user identification information for the user U1 is stored in the service information storage 44. If not stored, it means that the user U1 is not registered as a recipient of the service, so the process is terminated.

On the other hand, if stored, the decryption request processor 411 makes a "(32) session password decryption request". Specifically, in the "(32) session password decryption request", the decryption request processor 411 transmits the service server identification information (S) stored in the service information storage 44 of the service server 4-1, the user identification information for the user U1, and the first encrypted information encrypted by the user terminal 3-1, to the management server 2 by means of cryptographic communications, to request decryption of the session password.

Figure 9:
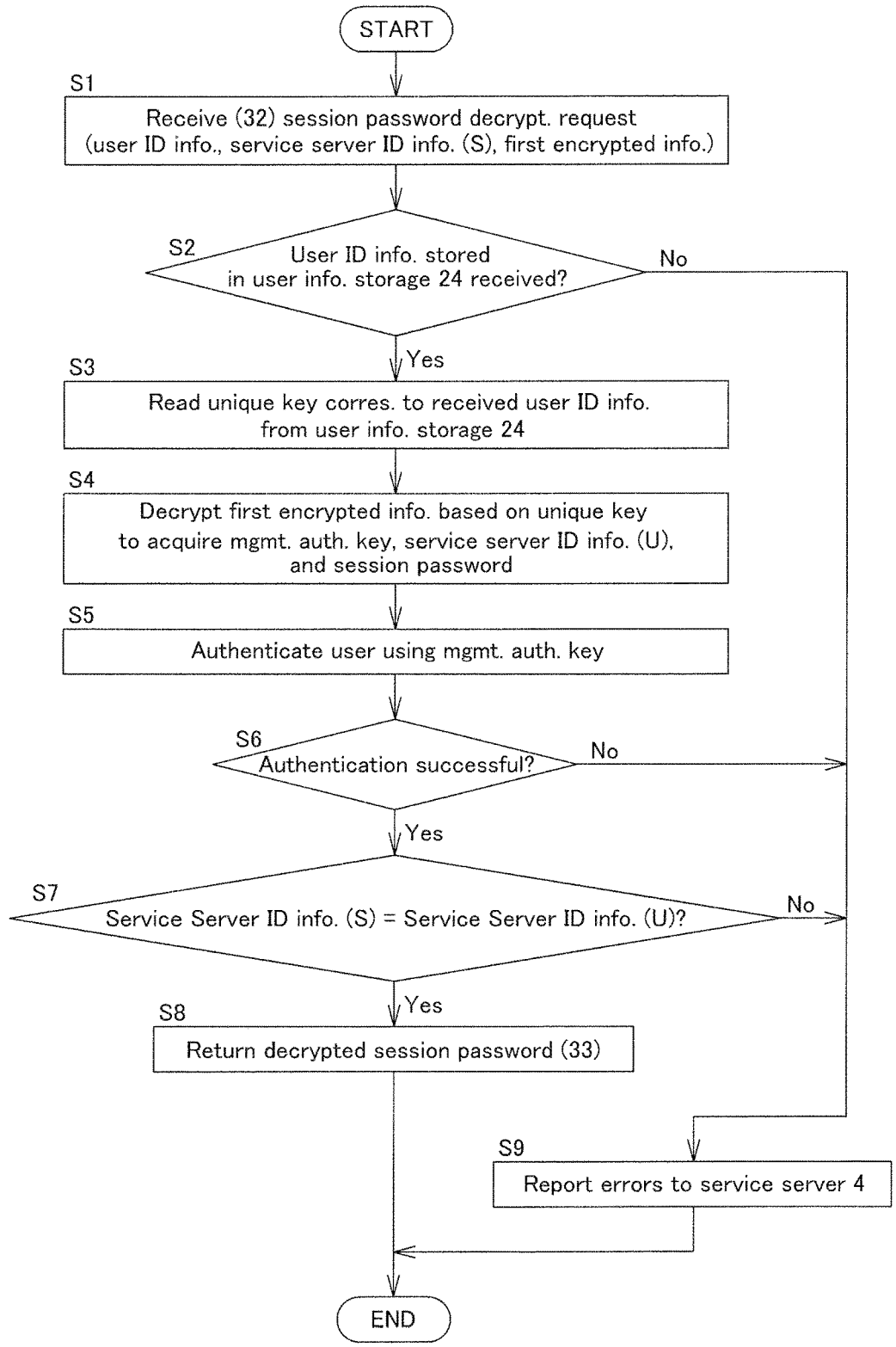
FIG. 9 is a flow-chart illustrating an example of the operation of the management server shown in FIG. 2.

FIG. 9 is a flow-chart illustrating an example of the operation of the management server 2 that has received the "(32) session password decryption request". Specifically, the management server 2 receives the "(32) session password decryption request (user identification information, service server identification information (S), first encrypted information)" by means of cryptographic communications (step S1).

Next, the reply processor 214 checks whether or not the received user identification information for the user U1 is stored in the user information storage 24 (step S2). If not stored (NO at step S2), it means that the user U1 is not a registered user, so an error is sent to the service server 4-1 (step S9) and the process is terminated. On the other hand, if stored (YES at step S2), the reply processor 214 reads out the unique key corresponding to the user identification information from the user information storage 24 (step S3).

Next, the reply processor 214 causes the decryption section 213 to decrypt the first encrypted information encrypted by the user terminal 3-1 based on the read unique key, to acquire the management authentication key, the service server identification information (U), and the session password (step S4).

Subsequently, the reply processor 214 compares the decrypted management authentication key with the management authentication key stored in the user information storage 24 to authenticate the user U1 (step S5). Then, if the authentication fails (NO at step S6), it is believed that one that has made the "(31) service request" is not the genuine user U1, so the reply processor 214 transmits, to the service server 4, an error as the information indicating that the authentication has failed (step S9), and terminates the process.

As has been described above, with the processes (31), (32), and steps S1 to S6, the management server 2 can verify whether or not one that has made the "(31) service request" is a genuine user. This makes it possible to prevent use of the services by unauthorized users. In order to carry out authentication, it is necessary to decrypt the first encrypted information, and the management authentication key is also necessary. However, because the user authentication can be carried out without storing the management authentication key and the unique key that is necessary for decrypting the first encrypted information in the service server 4, security can be enhanced even when the service (service server 4) is provided by a third-party vendor or the like.

On the other hand, if the authentication succeeds (YES at step S6), it is believed that one that has made the "(31) service request" is the genuine user U1, so the reply processor 214 compares the service server identification information (S) and the service server identification information (U) with each other to check the validity of the service server 4 (step S7). The service server identification information (S) is the service server identification information for the service server that has made the session password decryption request to the management server 2.

On the other hand, the service server identification information (U) is the service server identification information for the service server to which the user U1 (user terminal 3-1) has made a request for the service. Therefore, if a genuine service request process is made, the service server identification information (S) and the service server identification information (U) must be identical to each other.

Therefore, if the service server identification information (S) and the service server identification information (U) are not identical (NO at step S7), it is possible that the user U1 has made a mistake in choosing a service server to make a service request, or that an unauthorized service server masquerades as the genuine service server 4. For this reason, if the service server identification information (S) and the service server identification information (U) are not identical (NO at step S7), the reply processor 214 does not transmit the decrypted session password to the service server 4-1 but transmits, to the service server 4-1, an error as the information indicating that the authentication of the service server has failed (step S9), and the process is ended.

This prevents an erroneous request by the user and service server spoofing, and enhances the security performance.

On the other hand, if the service server identification information (S) and the service server identification information (U) are identical (YES at step S7), the reply processor 214 sends back the decrypted session password to the service server 4-1 by means of cryptographic communications (step S8, "(33) return of decrypted session password").

Referring back to FIG. 8, when the session password decrypted in the process (33) is received at the service server 4-1, the service key transmission section 412 executes the process of "(34) transmission of service authentication key". Specifically, the service key transmission section 412 generates a service authentication key with various key generating means, such as random numbers. The service key transmission section 412 encrypts the generated service authentication key with the decrypted session password and transmits the encrypted service authentication key to the user terminal 3-1 (user U1).

Then, in the user terminal 3-1, the service-key acquisition section 312 causes the decryption section 315 to decrypt the transmitted service authentication key with the session password stored in the user side storage 34, and stores the service authentication key in the user side storage 34 (an example of the second step).

In this way, the user terminal 3-1 can acquire the service authentication key that is necessary to access the service server 4-1.

The service server access section 313 executes the process of "(35) service server access". Specifically, when it is desired to receive the service of the service server 4-1, the service server access section 313 accesses the service server 4-1 and transmits the user identification information and the service authentication key that are stored in the user side storage 34 to the service server 4-1. Then, at the service server 4-1, the user identification information for the user U1 (user terminal 3-1) and the service authentication key are received. The authentication section 413 checks whether or not the user identification information for the user U1 is stored in the service information storage 44. If not stored, it means that the user U1 is not registered as a recipient of the service, so the process is terminated.

On the other hand, if stored, in other words, if the user identification information for the user U1 matches any of the user identification information for a plurality of users stored in the service information storage 44, the authentication section 413 determines that the user U1 is a user who is registered as a recipient of the service, and executes authentication of the user U1 (user terminal 3-1) using the received service authentication key.

If the authentication has succeeded, the service providing section 414 provides the service to the user U1 (user terminal 3-1) for which the authentication has succeeded. On the other hand, if the authentication has failed, the service providing section 414 does not provide the service to the user U1 (user terminal 3-1) for which the authentication has failed.

The processes (31) to (35) are equivalent to an example of the service key acquisition process, and the process (31) is equivalent to an example of the first step. It is also possible that in the first step (31), the service server identification information may not be encrypted, the first encrypted information may not contain the service server identification information, and the reply processor 214 may not execute the process of step S7. It is also possible that in the first step (31), the management authentication key may not be encrypted, the first encrypted information may not contain the management authentication key, and the reply processor 214 may not execute the processes of steps S5 and S6.

With the above-described processes (11) to (15), each time a service (service server) provided to the users in the group is newly added, the user identification information for the users belonging to the group corresponding to the added service is transmitted to the service server that provides the added service by means of cryptographic communications.

This means that each of the members of the group does not need to transmit their user identification information individually to the service server 4. The identification information for the users stored in the management server 2 is transmitted from the management server 2 to the service server. Therefore, even when a new service is added, the identification information indicating the same user can be matched among a plurality of services. Moreover, because each of the members in the group does not need to transmit their user identification information to the service server 4, it is possible to simplify the process of registering the identification information for the members of the group with the service server 4.

It is not always necessary to execute the processes (5) and (14), and for example, the user terminal 3 may transmit the identification information for the member who uses the service separately to each of the service servers 4.

With the above-described processes (21) to (23), each time a user is newly added to a group, the user identification information for the added user is transmitted to all the service servers that provide the services to the group by means of cryptographic communications. As a result, the service servers 4 are notified of the user identification information, which is necessary to make all the services available to the group, by merely adding the user to the group. Therefore, the process of making the service available to the newly added user is simplified.

With the above-described processes (31) to (35), the service authentication key, which is necessary for the user terminal 3 to receive the service from the service server 4, is not stored in the management server 2, and the user terminal 3 acquires the service authentication key from the service server 4. This reduces the risk of leakage of the service authentication key to a third party and the risk of unauthorized use of the service when the service server 4 (or a vendor that uses the service server 4 to provide the service) is not involved.

With the processes (31) to (35), security is enhanced by not allowing the service server 4 to store the unique key used for the cryptographic communications between the management server 2 and the user terminal 3. At the same time, the session password for performing the cryptographic communications between the user terminal 3 and the service server 4 is encrypted based on the unique key and transmitted from the user terminal 3 to the service server 4, and the decryption of the session password is requested to the management server 2 by the service server 4. Thereby, the service server 4 is allowed to acquire the session password so that the service server 4 can carry out cryptographic communications with the user terminal 3. This enables the service server 4 and the user terminal 3 to carry out cryptographic communications while at the same time preventing leakage of the session password.

DESCRIPTION OF REFERENCE NUMERALS AND SIGNS

1: user information management system
2: management server
3, 3-1 to 3-5: user terminal
4, 4-1, 4-2: service server
5: network
21, 31, 41: control unit
22, 32, 42: operation unit
23, 33, 43: display unit
24: user information storage
25: service server information storage
34: user side storage
44: service information storage
210: registration processor
211: identification-information notification processor
213: decryption section
214: reply processor
215, 316, 415: cryptographic communication processor
310: request processor
311: service-server information acquisition section
312: service-key acquisition section
313: service server access section
314: encryption section
315: decryption section
410: server registration processor
411: decryption request processor
412: service key transmission section
413: authentication section
414: service providing section
A, B: service
G1, G2: group
U1 to U5: user

The invention claimed is:

1. A user information management system comprising:
a management server for managing information on a group of users;
user terminals respectively corresponding to the users; and
a service server for providing services to the users;
wherein the management server, the service server, and the user terminals are connected via a network to enable mutual transmission and reception of data;
the management server and the service server are enabled for cryptographic communications with each other, wherein:
  each of the user terminals includes a user side storage storing user identification information for identifying each of the users, a management authentication key used by the management server to authenticate each of the users, and a unique key that is unique to one of the users to carry out cryptographic communications with the management server and that is not provided to the service server;
  the management server includes a user information storage storing user identification information for respectively identifying the users belonging to the group, the unique key, and the management authentication key, and decrypts encryption information encrypted by each of the user terminals, based on the unique key of the user, the unique key being stored in the user information storage;
  each of the user terminals executes a first step of encrypting, based on the unique key, a session password and the management authentication key, and transmits the session password and the management authentication key to the service server;
  the service server includes a storage device and a decryption request processor that receives the encrypted session password and the encrypted management authentication key from the user terminal, and transmits the encrypted session password and the encrypted management authentication key to the management server by means of the cryptographic communications;
  the management server further includes a reply processor that: causes the management server to decrypt, based on the unique key, the management authentication key and the session password which are transmitted from the decryption request processor; compares the decrypted management authentication key with the management authentication key stored in the user information storage to perform authentication of the users; and performs one of i) notifying an error of the authentication to the service server when the authentication fails, and ii) sending back the decrypted session password to the service server by means of cryptographic communications when the authentication succeeds;

the service server generates a service authentication key to allow each of the user terminals to receive provision of service;

the service server encrypts the generated service authentication key using the decrypted session password, and transmits to each of the user terminals the service authentication key;

each of the user terminals carries out a second step of acquiring the service authentication key by decrypting the encrypted service authentication key by means of the session password; and each of the user terminals uses the acquired service authentication key to access the service server.

2. The user information management system according to claim 1, wherein:

the management server further comprises a service server information storage storing service-server identification information for identifying the service server;

the service server, when carrying out communications with the management server, transmits to the management server service-server identification information identifying the service server itself;

each of the user terminals receives the service-server identification information from the management server;

each of the user terminals, in the first step, further encrypts the service-server identification information based on the unique key and transmits to the service server, the service-server identification information;

the decryption request processor of the service server further receives the encrypted service-server identification information from a user terminal, and transmits the encrypted service-server identification information to the management server by means of the cryptographic communications; and the reply processor of the management server decrypts the service-server identification information transmitted from the decryption request processor based on the unique key, checks whether or not the decrypted service-server identification information matches the service-server identification information for that service server from which the service-server identification information has been transmitted, and when the decrypted service-server identification information does not match the service-server identification information, the decrypted session password is not transmitted to the service server even when the authentication succeeds as a result of comparison of the decrypted management authentication key with the management authentication key stored in the user information storage.

3. A user information management method for managing user information on a group of users and corresponding user terminals comprising:

storing, in a user side storage of each of the user terminals corresponding to the users, user identification information for identifying one of the users, a management authentication key used by a management server to authenticate one of the users, and a unique key that is unique to one of the users to carry out cryptographic communications with the management server, wherein the service server provides service to the users and is enabled for cryptographic communications with the management server, the management server manages information on the group of users and the unique key is not provided to the service server;

storing, in a user information storage of the management server, user identification information for respectively identifying the users belonging to the group, the unique key, and the management authentication key;

decrypting, by the management server, encryption information encrypted by each of the user terminals, based on the unique key of each of the users, the unique key being stored in the user information storage;

executing by each of the user terminals a first step of encrypting, based on the unique key, a session password and the management authentication key and transmitting the session password and the authentication key to the service server;

receiving at a decryption request processor of the service server the encrypted session password and the encrypted management authentication key from the user terminal and transmitting the encrypted session password and the encrypted management authentication key to the management server by means of the cryptographic communications with the service server;

decrypting by a reply processor of the management server, based on the unique key, the management authentication key and the session password which are transmitted from the decryption request processor, where the reply processor of the management server further performs the following:

comparing the decrypted management authentication key with the management authentication key stored in the user information storage to perform authentication of the users; and performing one of i) notifying an error of the authentication to the service server when the authentication fails, and ii) sending back the decrypted session password to the service server by means of cryptographic communications when the authentication succeeds;

generating, by the service server, a service authentication key to allow the user terminal to receive provision of the service;

encrypting, by the service server, using the decrypted session password, the generated service authentication key, and transmitting the service authentication key to each of the user terminals;

executing a second step by each of the user terminals of acquiring a service authentication key by decrypting the encrypted service authentication key by means of the session password; and accessing the service server by each of the user terminals using the acquired service authentication key.

* * * * *